(12) United States Patent
Ng et al.

(10) Patent No.: US 7,433,945 B2
(45) Date of Patent: Oct. 7, 2008

(54) DYNAMIC CONFIGURATION AND SELF-TUNING OF INTER-NODAL COMMUNICATION RESOURCES IN A DATABASE MANAGEMENT SYSTEM

(75) Inventors: Jack Hon Wai Ng, Markham (CA); Jeffrey J. Goss, Toronto (CA); Hebert W. Pereyra, Toronto (CA); Kaarel Truuvert, Toronto (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 10/410,856

(22) Filed: Apr. 9, 2003

(65) Prior Publication Data
US 2004/0003088 A1 Jan. 1, 2004

(30) Foreign Application Priority Data
Apr. 24, 2002 (CA) .................................... 2383825

(51) Int. Cl.
*G06F 15/173* (2006.01)
(52) U.S. Cl. ........................ 709/223; 709/213; 711/147
(58) Field of Classification Search ......... 709/213–216, 709/220–223; 713/100; 711/147
See application file for complete search history.

(56) References Cited

U.S. PATENT DOCUMENTS

| 5,371,733 | A | | 12/1994 | Denneau et al. |
| 5,854,896 | A | * | 12/1998 | Brenner et al. ............... 709/221 |
| 6,072,774 | A | | 6/2000 | Natarajan et al. |
| 6,192,391 | B1 | | 2/2001 | Ohtani |
| 6,247,109 | B1 | * | 6/2001 | Kleinsorge et al. ............ 712/13 |
| 6,247,161 | B1 | | 6/2001 | Lambrecht et al. |
| 6,275,975 | B1 | | 8/2001 | Lambrecht et al. |
| 6,278,718 | B1 | | 8/2001 | Eschholz |
| 6,381,682 | B2 | * | 4/2002 | Noel et al. .................. 711/153 |
| 6,442,661 | B1 | * | 8/2002 | Dreszer ..................... 711/170 |
| 6,442,706 | B1 | * | 8/2002 | Wahl et al. ..................... 714/6 |
| 6,748,429 | B1 | * | 6/2004 | Talluri et al. ................ 709/221 |

(Continued)

FOREIGN PATENT DOCUMENTS

EP 989490 A2 3/2000

OTHER PUBLICATIONS

A WOS/Sup TM/-Based Solution for High Performance Computing; N. Abdennadher, G. Babin, P. Kropf; This paper appears in Cluster Computing and the Grid, 2001. Proceedings. First IEEE/ACM International Symposium, pp. 568-573.

(Continued)

*Primary Examiner*—Glenton B. Burgess
*Assistant Examiner*—Lashanya R Nash
(74) *Attorney, Agent, or Firm*—Gates & Cooper LLP

(57) ABSTRACT

A database management system in which a plurality of nodes form a database instance, each node including a communication manager for dynamically configuring inter-nodal communication resources. The communication manager receives communication resource allocation requests from clients or a self-tuning algorithm. A resource self-tuning mechanism allocates or de-allocates memory blocks used for communication resource elements dynamically in real time without cycling the instance. Memory blocks are de-allocated asynchronously by placing associated communication resource elements in quarantine until all communication resource elements associated with the memory block are quarantined.

3 Claims, 8 Drawing Sheets

U.S. PATENT DOCUMENTS

| | | | |
|---|---|---|---|
| 6,785,888 B1 * | 8/2004 | McKenney et al. | 718/104 |
| 7,058,702 B2 * | 6/2006 | Hogan | 709/220 |
| 7,152,157 B2 * | 12/2006 | Murphy et al. | 713/100 |
| 2001/0033646 A1 | 10/2001 | Porter et al. | |
| 2003/0135619 A1 * | 7/2003 | Wilding et al. | 709/225 |
| 2004/0177245 A1 * | 9/2004 | Murphy | 713/100 |

OTHER PUBLICATIONS

The Design of High Availability in the Dawning Server Consolidation System; M. Chen, W. Gao, W. Zhang, L. Wu; High This paper appears in Performance Computing in the Asia-Pacific Region, 2000. Proceedings. The Fourth International Conference/Exhibition, pp. 436-438, vol. 1.

Fault-Tolerant Hierarchical Routing; G. Alari, A Datta, J Derby and J. Lawrence; This papers appears in Performance, Computing and Communications Conference, 1997. IPCCC 1997, IEEE International, pp. 159-165.

Intelligent Agents for Network Management, C. Frei and B. Faltings; This paper appears in AI for Network Management Systems (Digest No. 1997/094), IEEE Colloquium, pp. 2/1-2/4.

* cited by examiner

US 7,433,945 B2

DYNAMIC CONFIGURATION AND SELF-TUNING OF INTER-NODAL COMMUNICATION RESOURCES IN A DATABASE MANAGEMENT SYSTEM

CROSS-REFERENCE TO RELATED APPLICATIONS

This application claims benefit under 35 U.S.C. 119 of Canadian Application 2,383,825 filed on Apr. 24, 2002.

FIELD OF THE INVENTION

The invention relates to database management systems and in particular to dynamic configuration and self-tuning of inter-nodal communication resources within a database management system.

BACKGROUND OF THE INVENTION

In database management systems such as International Business Machine's (IBM) DB2 Version 7, parameters that govern an amount of inter-nodal communication resources cannot be configured dynamically. A user must estimate values of communication resource parameters with respect to workloads that will be run against a system prior to starting up an instance of a database management system. However, if the estimate is not accurate or the workloads change after the instance has been started, then communication resources can be exhausted, thus preventing the database management system from servicing certain database requests without delay.

When such an event occurs, the user has to either reissue the request after other workloads have diminished or force all applications, stop the database instance, and reconfigure the communication resource parameters with more optimal values. This is clearly a penalty on the usability and performance of the database management system, because recycling the instance and rerunning the workloads are extremely time-consuming.

In addition, since communication resources can occupy a significant amount of memory space, the user may want to release resources in exchange for memory for other purposes. However, current database engine designs require that the instance be stopped and restarted in order for the new parameter values to take effect.

Prior art solutions that may solve the dynamic configuration problem do not service requests asynchronously or undo asynchronous requests without delay. In addition, they do not permit the database server to transparently increase or decrease its communication resources in response to fluctuations in communication workload requirements.

There is therefore a need for a database management system that permits users to dynamically configure communications resources used by the system. There also exists a need for a database management system that adapts to fluctuations in workloads in a way that is transparent to the user.

SUMMARY OF THE INVENTION

It is therefore an object of the invention to provide a database management system that permits a client or an optimization algorithm to dynamically configure an amount of memory used for communications resources by the system.

It is a further object of the invention to provide a database management system that automatically adapts to fluctuations in workloads in a way that is transparent to the user.

The invention therefore provides a database management system in which a plurality of nodes form a database instance, each node including a communication manager for dynamically configuring inter-nodal communication resources. The communication manager receives communication resource allocation requests from clients or a self-tuning algorithm. A resource self-tuning mechanism allocates or de-allocates memory blocks used for communication resource elements dynamically in real time without cycling the instance. Memory blocks are de-allocated asynchronously by placing associated communication resource elements in quarantine until all communication resource elements associated with the memory block are quarantined.

BRIEF DESCRIPTION OF THE DRAWINGS

It will be noted that throughout the appended drawings, like features are identified by like reference numerals.

DETAILED DESCRIPTION

The invention therefore provides a database management system in which a plurality of nodes form a database instance. Each node comprises a fast communications manager (FCM) for dynamically reconfiguring inter-nodal communication resources. The FCM receives requests from clients or the optimization algorithm to re-allocate communication resources. A resource self-tuning mechanism maintains a memory descriptor table that stores a plurality of memory descriptors and a quarantine, for allocating and de-allocating communication resources in response to the requests received from the clients. A free-resource pool stores available communication resources.

The invention also provides a method for dynamically increasing communication resources available to the instance of the database. The method begins with a step of computing a number of additional memory blocks required to satisfy the request, then allocating new memory blocks to support the additional communication resources. A memory descriptor table is searched for a vacant entry. The new memory blocks are allocated and anchored by recording a pointer and a status of the memory block in the vacant entry. The communication resource elements are created from the new memory blocks and added to a free resource pool to make them available for inter-nodal communication services, until all the required additional resources have been created.

The invention also provides a two-phased method for decreasing the communication resources available to the instance of the database management system. In a first phase, the method involves searching for communication resource elements that can be de-allocated immediately, and registering those that must be de-allocated asynchronously. A second phase provides logic for moving a used resource element to a quarantine area, and de-allocating a memory block when all associated communication resource elements have been quarantined.

The second phase is invoked whenever a resource element is returned to the FCM. If the associated memory block is not marked for asynchronous de-allocation, the communication resource element is returned to the free memory pool. If the associated memory block is marked for asynchronous de-allocation, the associated communication resource element is placed in the quarantine.

An embodiment of the invention is described below with reference to International Business Machine's (IBM) DB2 Universal Database Manager (UDM) as an example of only one embodiment of a database management system. The invention is applicable to any database management system that uses inter-nodal communications resources.

Figure 1:
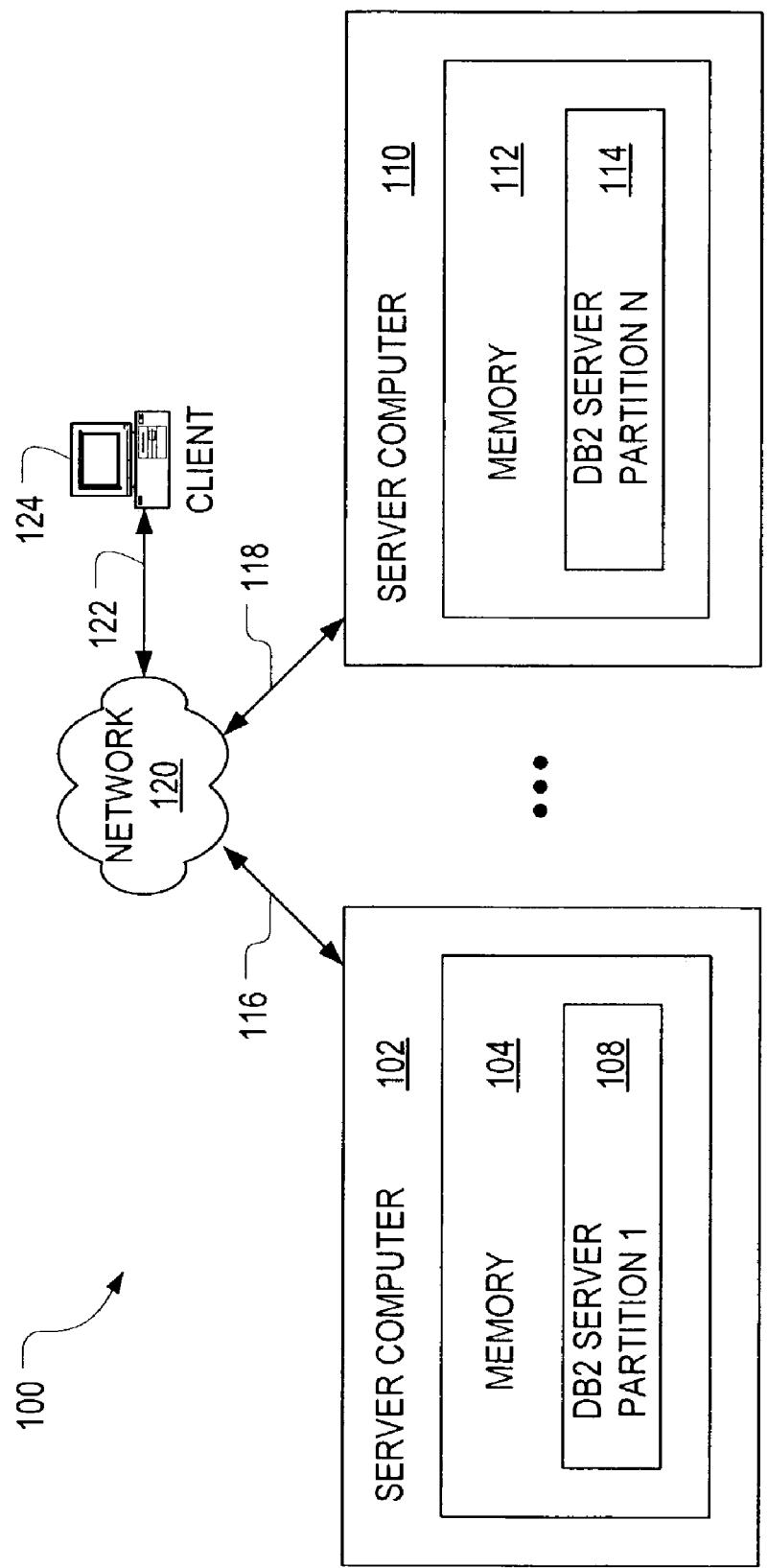
FIG. 1 illustrates a schematic diagram of a computer network in which a plurality of partitions of a database management system (DB2) are deployed.

FIG. 1 illustrates a schematic block diagram of a computer network 100 having a plurality of server computers 102,110 (only two shown) connected 116,118 to a network 120. The network 120 may be, for example, a local area network (LAN), a wide area network (WAN), a municipal area network (MAN), or an inter-network, such as the Internet. A client computer 124 controlled by a user (not shown) is also connected 122 to the network 120. Alternatively, the client 124 may be connected (not shown) directly to one of the server computers 102,110. Each server computer 102,110 has a respective memory 104,112. The memory 104 of the server computer 102 has a first DB2 server partition 108, and the memory 112 of the server computer 110 has an $N^{th}$ DB2 server partition. The server partitions 108,114 are also individually called nodes. The server partitions 108,114 are collectively referred to as a database management system instance.

Figure 2:
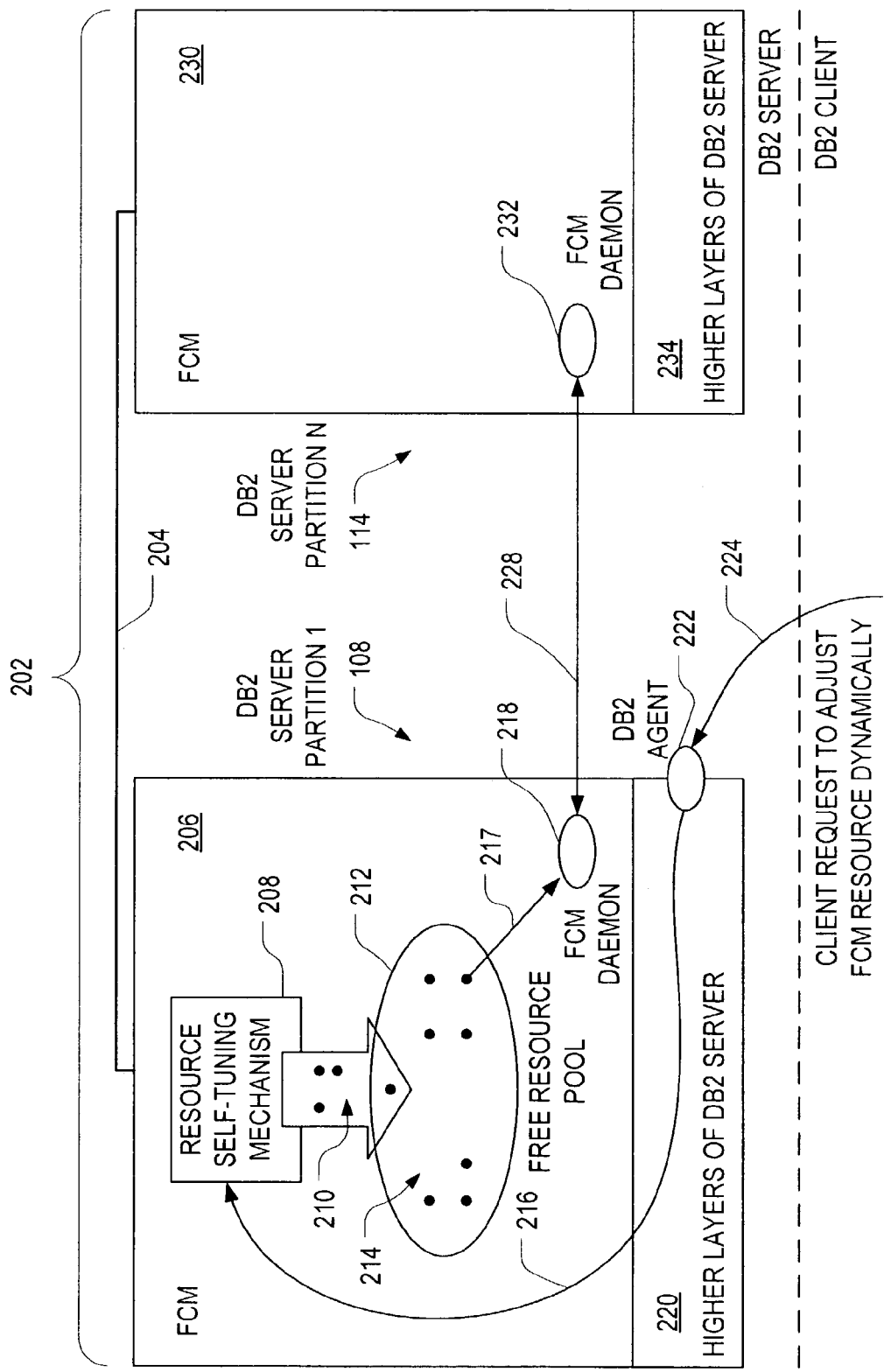
FIG. 2 illustrates a schematic diagram of DB2 server partitions in the deployment of the DB2 shown in FIG. 1.

FIG. 2 illustrates a schematic diagram of a DB2 server instance 202 that includes the DB2 server partitions 108,114 shown in FIG. 1. The first DB2 server partition 108 includes a fast communications module 206 (FCM) and higher layers 220 of DB2 server. The FCM 206 has a resource self-tuning mechanism 208 for dynamically allocating or de-allocating communication resources 210 at a request of a user (not shown). The resource self-tuning mechanism 208 may also automatically allocate communication resources 214, if communication resource elements 214 in a free resource pool 212 begin to run out. The FCM 206 further includes an FCM daemon 218 that uses 217 the communication resource elements 214 to communicate 228 with other DB2 server partitions 114. The higher layers of the DB2 server 220 include a DB2 agent 222 that receives client resource allocation requests 224. The DB2 agent 222 communicates the client resource allocation requests using messages 216 to the resources self-tuning mechanism 208. The $N^{th}$ DB2 server partition 114 is identical to the first DB2 server partition 108, even though only the FCM 230, FCM daemon 232 and higher layers of the $N^{th}$ DB2 server 234 are shown for clarity. The DB2 server partitions 108,114 communicate 204 through the network 120 (FIG. 1).

Figure 3:
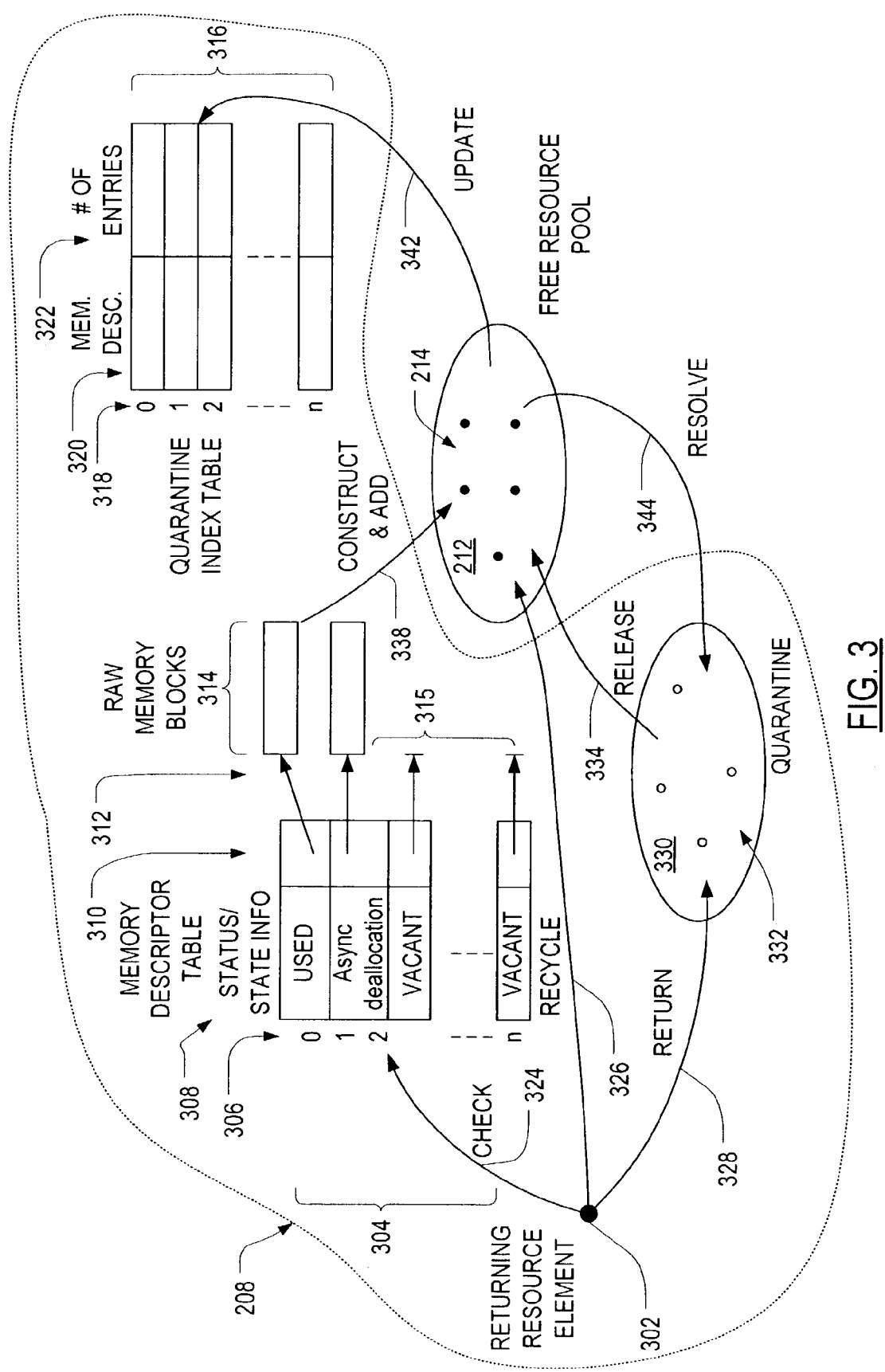
FIG. 3 illustrates a schematic diagram of the resource self-tuning mechanism and free resource pool shown in FIG. 2.

FIG. 3 illustrates a schematic diagram of the resource self-tuning mechanism 208 and free resource pool 212 shown in FIG. 2. The resource self-tuning mechanism 208 includes a process 302 for returning communication resource elements after they are released from use by the FCM daemon 218 (FIG. 2), a memory descriptor table 304, a quarantine index table 316 and a quarantine area 330. It should be noted that the quarantine index table 316 is a data structure that is, for example, allocated and de-allocated during execution of methods in accordance with the invention, as described below. The memory descriptor table 304 includes a plurality of records, each having a memory descriptor 306, a status/state information field 308, and a memory pointer field 310. The status/state information field may be set to any one of three different values. The three values respectively represent a status of "USED", "VACANT" or "ASYNCHRONOUS DE-ALLOCATION". If the status/state information field 308 is set to "USED" then the respective memory pointer field 310 points to a raw memory block 314, and the memory block 314 has been allocated to communication resource elements which may be in the free resource pool 212, or in use by the FCM daemon 218. If the status/state information field 308 is set to "VACANT" the respective memory pointer field 310 is set to a null pointer 315 (this type of record is a null entry, because the memory descriptor table is preferably a static structure of a predetermined size). If the status/state information field 308 is set to "ASYNCHRONOUS DE-ALLOCATION", the memory block is still held, pending release of associated communication resource elements, as will be described below in some detail. The quarantine area 330 is a collection of communication resource elements 332 that are associated with memory blocks pending de-allocation. The quarantine index table 316 includes a plurality of records each having an index field 318, a memory descriptor field 320, that stores a corresponding memory descriptor 306, and a field 322 that indicates a number of quarantined communication resource elements associated with the memory block identified by the memory descriptor field.

Figure 4A:
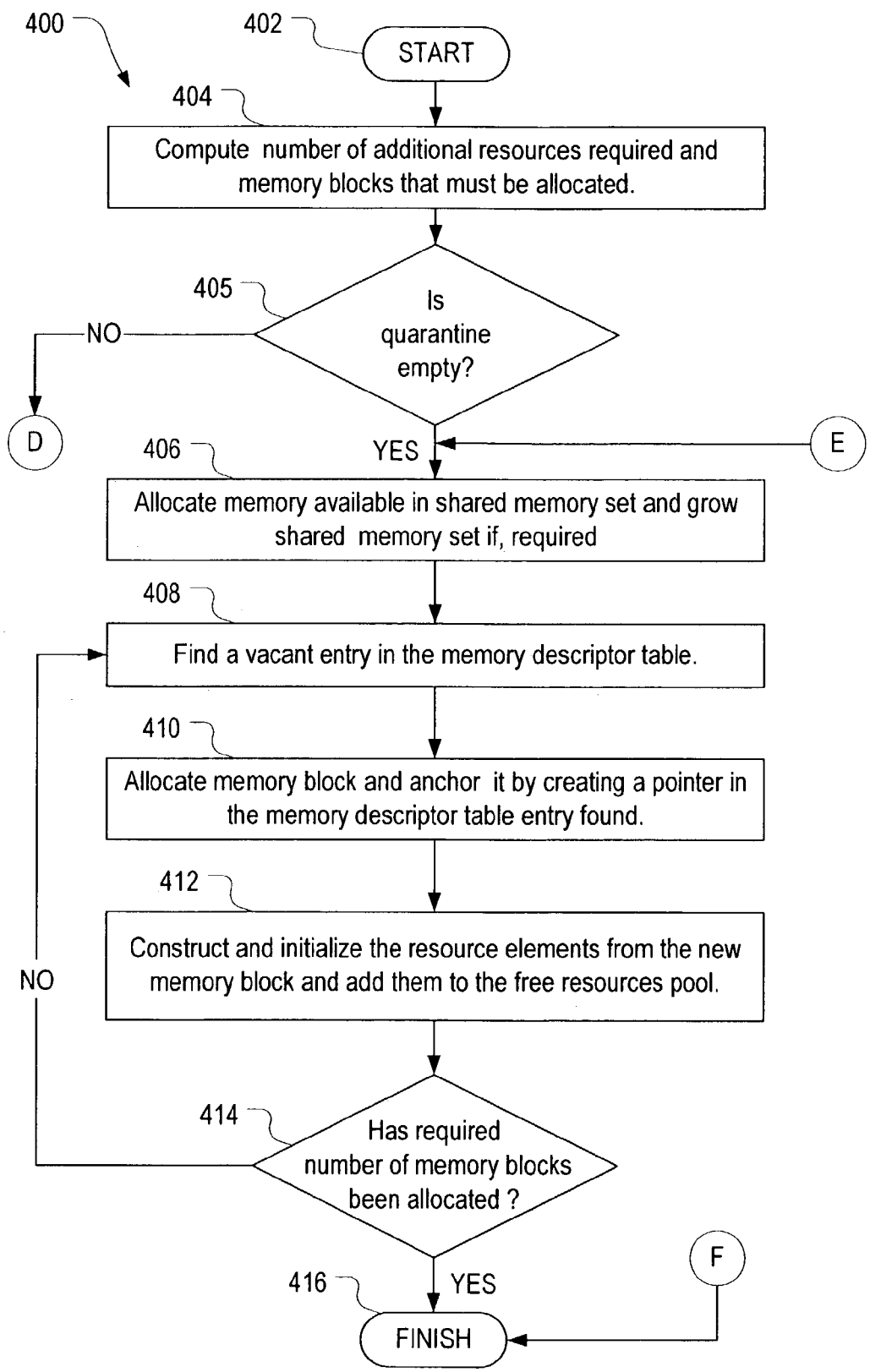
FIGS. 4A and 4B are a flowchart of a method in accordance with the invention for increasing communications resource allocations.
Figure 4B:
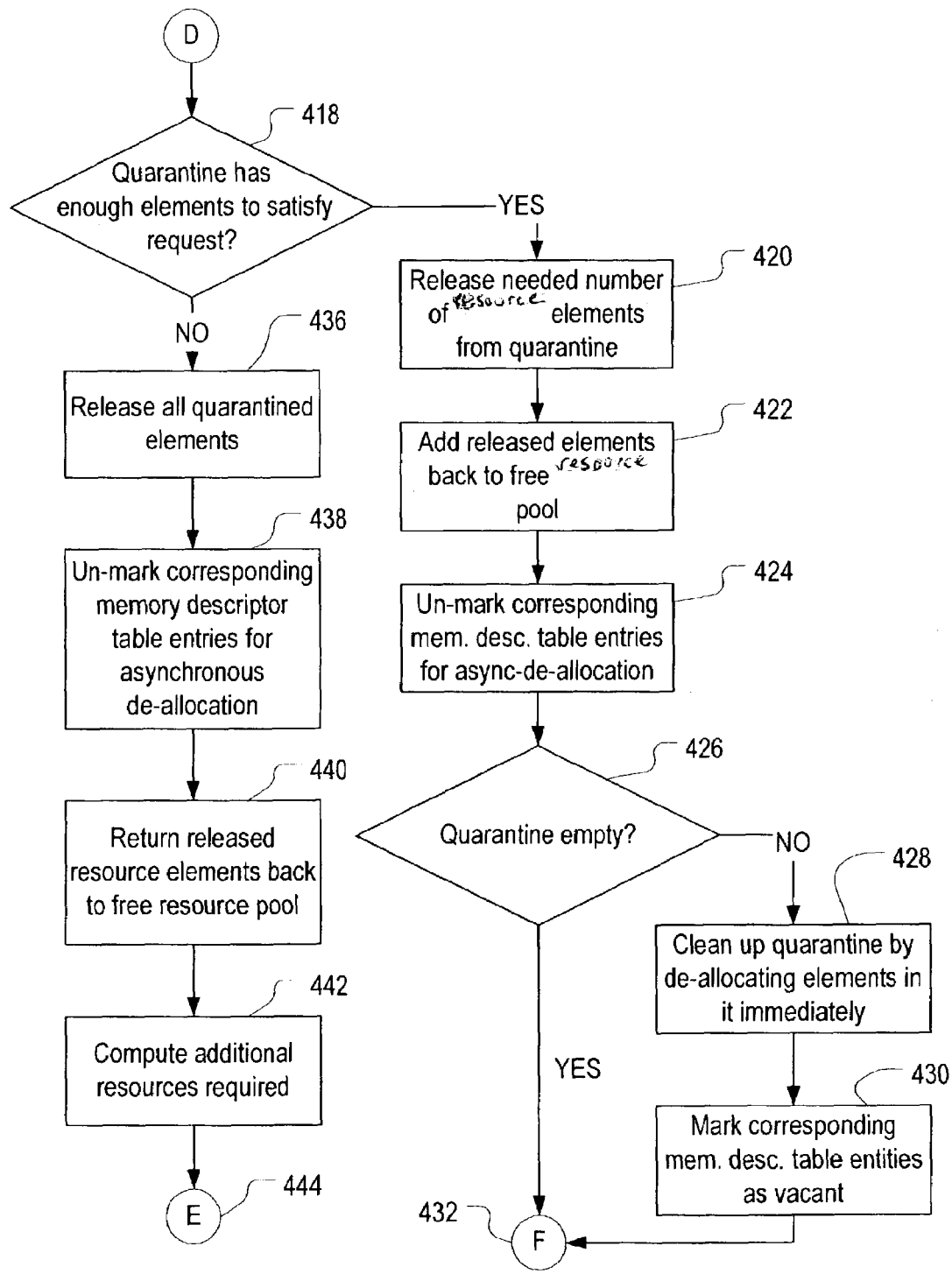

The invention also provides a method for dynamically increasing communication resources available to the instance 202 of the DB2. FIGS. 4A and 4B are a flowchart 400 of a method for handling a resource allocation request 224 (FIG. 2) received from a client or from the FCM daemon 218 to request a dynamic increase in communication resources. The client can request a dynamic increase (or decrease) in communication resources at any time. The FCM daemon 218 can request an increase if it finds that the free resource pool 212 is empty when it tries to initiate a communications session with another node 206, 230.

The method begins 402 with a step of computing a number of additional communication resource elements required, and the number of memory blocks that must be allocated to accommodate the communication resource elements (step 404). The number of communication resource elements required is computed, for example, by subtracting a current number of existing communication resource elements from a requested number. As is well known to persons skilled in the art, each memory block accommodates a predefined number of communication resource elements, the number being related to the operating system with which the DB2 is instantiated. Whenever a request for increasing communication resources is received, it is possible that the FCM 230 is already involved in a process of decreasing the communications resources, because the resource re-allocation requests can be sent at any time. Consequently, after the required number of additional resources has been computed, the quarantine is checked to determine if it is empty (step 405).

Figure 5A:
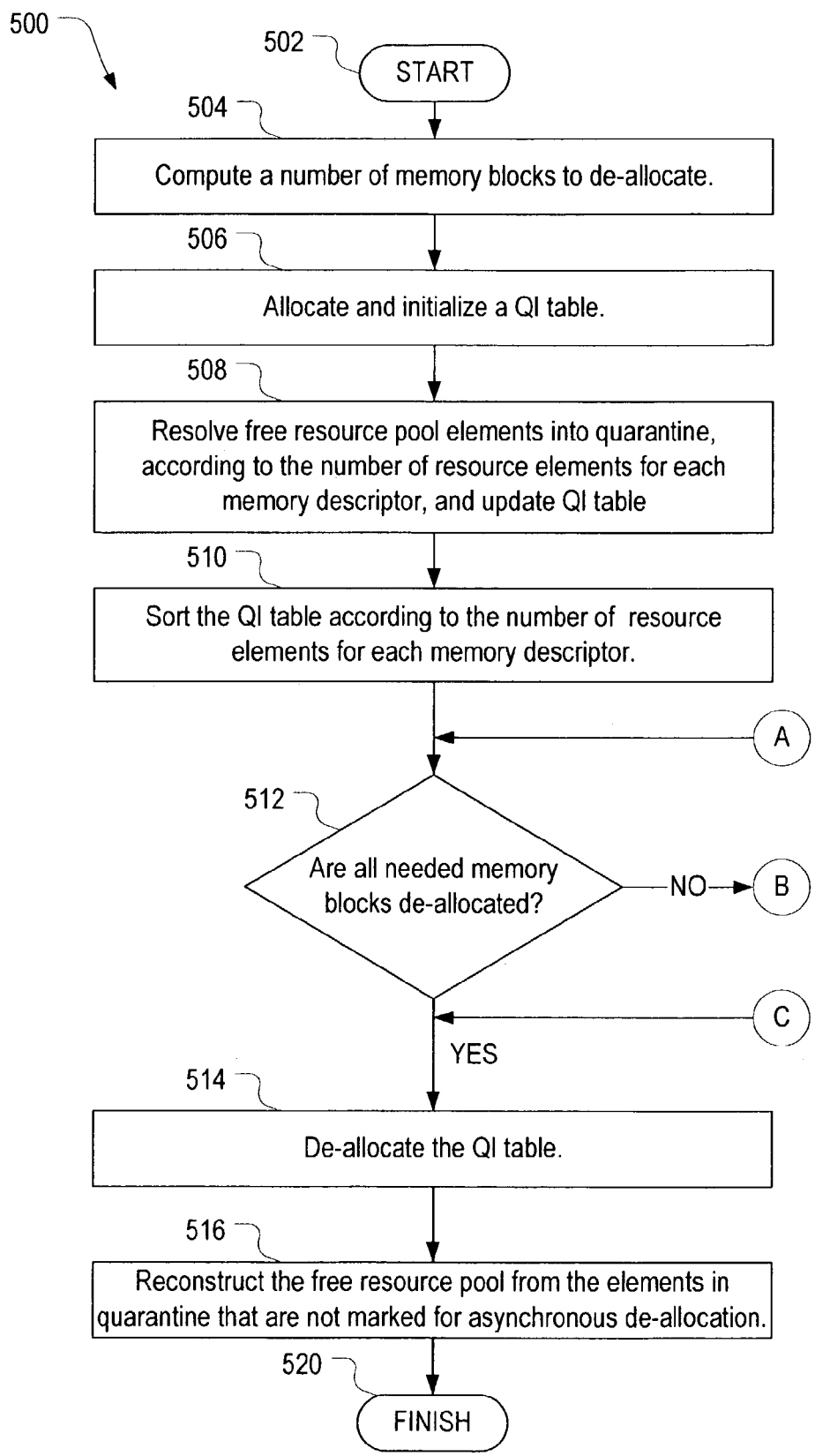
FIGS. 5A and 5B are a flowchart of a first phase of a method in accordance with the invention for decreasing communications resource allocations.
Figure 5B:
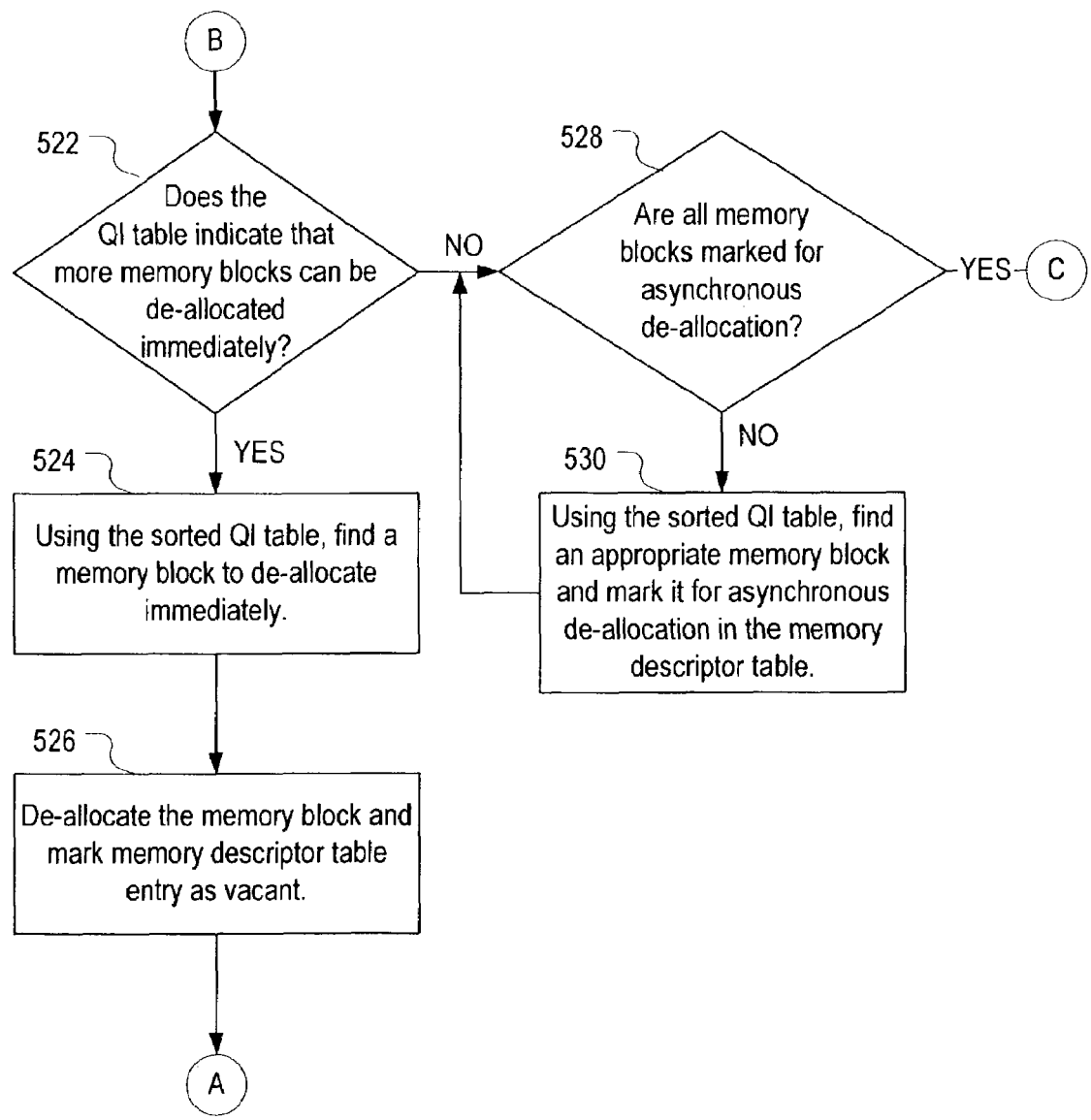

If the quarantine is empty, a process for decreasing communication resources, which will be explained below with reference to FIGS. 5A and 5B, is not underway. Consequently, the process proceeds to step 406, in which the required memory blocks are allocated from a shared memory set. If the shared memory set does not contain enough memory blocks to satisfy the request, the shared memory set is grown by sending a request to the operating system, in a manner well known in the art. It is assumed that the shared memory set can always be grown, and in practice this is almost inevitably true. If for any reason shared memory cannot be grown, the process cancels and a request denial message (not shown) is returned to the client. Next, the memory descriptor table 304 (step 408) is searched for a vacant entry. As noted above, the memory descriptor table 304 is a table of fixed size and contains at least as many rows as a maximum number of memory blocks permitted to be used for communication resources, as specified in a DB2 configuration file. In step 410 a one of the new memory blocks is allocated and anchored by creating a memory pointer that is stored in field 310 of the memory descriptor table 304. New communication resource elements 214 (FIG. 3) are constructed from the new memory block 314 and added to the free resource pool 212 to make them available for inter-nodal communication services (step 412). In step 414 it is determined whether the required number of new memory blocks 314 have been allocated. If so, the process branches back to step 408 where a next memory block is allocated, otherwise the process terminates (step 416).

If in step 405, described above, it is determined that the quarantine is not empty, a process to decrease communication resources is underway. Consequently, the process branches to step 418 (FIG. 4B), where it is determined whether the quarantine contains enough communication resource elements to satisfy the request to increase communication resources. If so, the required number of communication resource elements 332 are released from the quarantine (step 420). The released communication resource elements are then added back to the free resource pool 212 (step 422), and the status/state information field 308 in the memory descriptor table 304 for the corresponding memory blocks are changed from "ASYNCHRONOUS DE-ALLOCATION" to "USED" to indicate that the memory blocks are no longer to be de-allocated (step 424). In step 426 the quarantine is checked again to determine whether it is empty subsequent to the release performed in step 420. If the quarantine is empty, the process branches to connector "F" (FIG. 4A) at 432 and terminates. If the quarantine is not empty, there was a de-allocation request in progress that requested a larger decrease than the increase just performed. Consequently, the quarantine 330 is cleaned up by immediately de-allocating remaining communication resource elements 332 that the quarantine contains (step 428), and the corresponding entries in the memory descriptor table 304 are marked as "VACANT". The process then branches to connector "F" (FIG. 4A) at 432, and terminates.

If in step 418 it is determined that the quarantine 330 does not contain sufficient communication resource elements 214 to satisfy the request, all of the quarantined communication resource elements are released (step 436). The memory descriptor table 304 is then modified to change the status/state information 308 related to the corresponding entries from "SYNCHRONOUS DE-ALLOCATION" to "USED" (step 438). The released communication resource elements are then returned to the free resource pool 212 (step 440). The number of additional communication resources required is then computed by subtracting the number released from the quarantine in step 436 from the total number computed in step 404, and the process branches back to connector "E" (FIG. 4A) at 444, where the process continues as explained above.

The method and system in accordance with the invention also permits a client to request that communications resources be de-allocated (decreased). Depending on the usage level of the communication resources at the time that the client request 224 is received, a sufficient number of free communication resource elements 214 might not be available for immediate de-allocation to satisfy the request. It can potentially take a long time before adequate free communication resource elements become available to satisfy the. de-allocation request 224. To avoid blocking the database management instance 202 from performing other tasks while the dynamic configuration request 224 is being serviced, the invention provides an asynchronous mechanism to handle dynamic de-allocation requests.

The invention provides a two-phased method for decreasing the communication resources available to the instance 202 of the database management system. A first phase of the method involves searching for memory blocks that can be de-allocated immediately, and registering those that must be de-allocated asynchronously. A second phase provides logic for moving a used communication resource element to a quarantine area, and performing garbage collection. The second phase is invoked whenever a communication resource element is returned to the FCM 206.

Since the process of locating and identifying memory blocks for immediate and asynchronous de-allocation can be computationally complex, the first phase of the method is optimized using the quarantine index (QI) table 316 (FIG. 3).

FIGS. 5A and 5B are a flowchart 500 for implementing the first phase of processing a request to decrease communication resources dynamically. The method starts 502 by computing a number of memory blocks to be de-allocated (step 504), using methods described above. Then memory space for a QI table 316 is allocated, if required, and the QI table 316 is initialized, if required (step 506). All the free communication resource elements 214 in the free resource pool 212 are resolved into quarantine area 330, and the QI table 316 is correspondingly updated (step 508). The QI table 316 is then sorted according to the number of quarantined communication resource elements for each memory descriptor (step 510). If it is determined (step 512) that the required number of memory blocks have not been de-allocated, the process advances to step 522 (FIG. 5B), which is described below. Otherwise, the QI table 316 is de-allocated, if required (step 514). The free resource pool 212 is then reconstructed from the elements 332 in the quarantine area 330 that are not marked for asynchronous de-allocation (step 516) and the process finishes (step 520).

If the QI table 316 indicates that more memory blocks cannot be de-allocated immediately (step 522) the process moves to step 528, described below. Otherwise, using the sorted QI table 316, a memory block for immediate de-allocation is located (step 524). The memory block can be immediately de-allocated if the number of quarantined communication resource elements 332, which is recorded in column 322 of the quarantine index table 316 is equal to the total number of communication resource elements that can be created using the raw memory block. The memory block is de-allocated and the corresponding status/state information entry 308 in the memory descriptor table 304 is changed to "VACANT" (step 526). Thereafter, the process returns to step 512.

If the process branched from step 522 to step 528, as explained above, it is determined in step 528 whether all of the required memory blocks 314 are marked for asynchronous de-allocation. If so, the process returns to step 514 (FIG. 5A). Otherwise, using the sorted QI table 316, a memory block with the highest number of quarantined communication resource elements 332 is located and marked for asynchronous de-allocation in the memory descriptor table 304. Steps 528,530 are repeated until all memory blocks in the QI table 316 are marked for asynchronous de-allocation.

Figure 6:
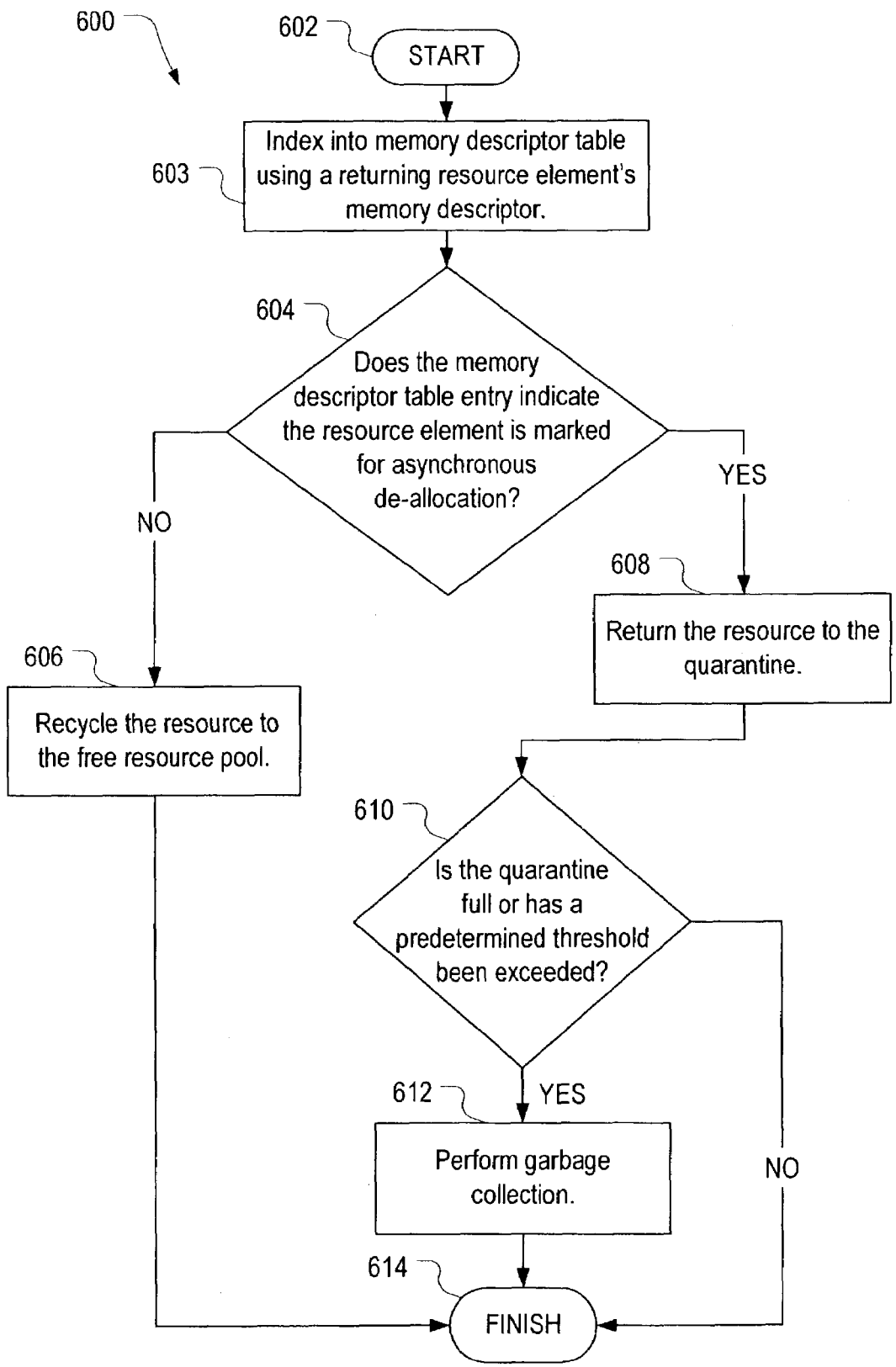
FIG. 6 is a flowchart of a second phase of the method for decreasing communications resource allocations.

FIG. 6 shows a flowchart 600 of the second phase of the method for responding to a request to decrease communication resources dynamically. The method starts 602 with a step of indexing into the memory descriptor table 304 using the memory descriptor of a returning communication resource elements 302 (step 603). It is then determined (step 604) whether the memory block associated with the returning communication resource element 302 in the memory descriptor table 304 has its status/state information 308 set to "ASYNCHRONOUS DE-ALLOCATION". If it does not, it is recycled to the free resource pool 212 (step 606) and the process finishes (step 614). Otherwise, the communication resource element 302 is placed in the quarantine area 330 (step 608). If it is determined in step 610 that the quarantine area 330 is full, or a predetermined quarantine threshold has been exceeded, garbage collection is performed to de-allocate any memory blocks that can be immediately de-allocated (step 612) because all associated communication resource elements have been returned to the quarantine. In either case, the process ends at 614.

Self-tuning of communication resources in adaptation to user workloads employs the method described above with reference to FIGS. 4, 5 and 6. The methods are invoked when the FCM component detects that resources have fallen below or risen above self-diagnosed thresholds, which are statically or dynamically established using specified or computed configuration parameters.

An advantage of the invention is that it permits clients to adjust inter-nodal communication resources, in an asynchronous fashion, without having to stop all applications and recycle the instance 202. In addition, because of the memory descriptor table 304 and the quarantine area 330, users can submit new requests 224 to adjust the resources immediately even when there is a request pending completion (which could take a long time). The FCM 206 does not have to wait for a background request to be finished before servicing a new request. Advantageously, this permits users to undo submitted requests immediately. As well, the invention provides a database management system's inter-nodal communication component with an ability to self-tune its communication resources in adaptation to workload requirements, without affecting running applications or requiring manual intervention by a database administrator.

The embodiment(s) of the invention described above is intended to be exemplary only. The scope of the invention is therefore intended to be limited solely by the scope of the appended claims.

What is claimed is:

1. A method for configuring communication resources in database management systems, the method comprising:
   receiving a communication resource configuration request at one of a plurality of server partitions that forms a database management system (DBMS) server instance. the communication resource configuration request being received from one of
   a client in the system.
   another server partition in the DBMS server instance, and
   a daemon in the one server partition;
   dynamically configuring a number of communication resource elements initialized in the one server partition for communication with one or more other server partitions in the DBMS server instance to satisfy the communication resource configuration request,
   dynamic configuration of the number of communication resource elements initialized in the one server partition being accomplished in real-time without having to stop and restart the DBMS server instance; and
   communicating the communication resource configuration request to at least one other server partition in the DBMS server instance using one or more communication resource elements initialized in the one server partition,
wherein the communication resource configuration request received by the one server partition is a request to increase communication resources and dynamically configuring the number of communication resource elements initialized in the one server partition comprises:
   computing a number of communication resource elements that needs to be initialized to satisfy the request to increase communication resources;
   computing a number of memory blocks that needs to be allocated to accommodate the number of communication resource elements needed, each memory block accommodating a predefined number of communication resource elements;
   determining whether there are any communication resource elements in a quarantine area of the one server partition; and
   responsive to there being no communication resource element in the quarantine area of the one server partition,
   allocating the number of memory blocks needed from a shared memory set of the computer on which the one server partition is located, and
   initializing the number of communication resource elements needed from the memory blocks allocated from the shared memory set of the computer on which the one server partition is located,
wherein responsive to there being one or more communication resource elements in the quarantine area of the one server partition, the one or more communication resource elements in the quarantine area being associated with one or more memory blocks marked for dynamic de-allocation, dynamically configuring the number of communication resource elements initialized in the one server partition further comprises:
   determining whether a number of communication resource elements in the quarantine area is greater than or equal to the number of communication resource elements needed;
   responsive to the number of communication resource elements in the quarantine area being greater than or equal to the number of communication resource elements needed,
   releasing the number of communication resource elements needed from the quarantine area, and
   returning the communication resource elements released from the quarantine area to a free resource pool of the one server partition, wherein responsive to the number of communication resource elements in the quarantine area being less than the number of communication resource elements needed, dynamically configuring the number of communication resource elements initialized in the one server partition further comprises:
   releasing all communication resource elements in the quarantine area;
   returning all communication resource elements released from the quarantine area to the free resource pool of the one server partition;
   computing a number of additional communication resource elements that still needs to be initialized to satisfy the request to increase communication resources;
   computing a number of additional memory blocks that still needs to be allocated to accommodate the number of additional communication resource elements still needed;
   allocating the number of additional memory blocks still needed from the shared memory set of the computer on which the one server partition is located; and initializing the number of additional communication resource elements still needed from the additional memory blocks allocated from the shared memory set of the computer on which the one server partition is located.

2. A method for configuring communication resources in database management systems, the method comprising:

receiving a communication resource configuration request at one of a plurality of server partitions that forms a database management system (DBMS) server instance, the communication resource configuration request being received from one of a client in the system, another server partition in the DBMS server instance, and a daemon in the one server partition;

dynamically configuring a number of communication resource elements initialized in the one server partition for communication with one or more other server partitions in the DBMS server instance to satisfy the communication resource configuration request, dynamic configuration of the number of communication resource elements initialized in the one server partition being accomplished in real-time without having to stop and restart the DBMS server instance; and communicating the communication resource configuration request to at least one other server partition in the DBMS server instance using one or more communication resource elements initialized in the one server partition, wherein the communication resource configuration request received by the one server partition is a request to decrease communication resources and dynamically configuring the number of communication resource elements initialized in the one server partition comprises:

computing a number of memory blocks that needs to be de-allocated to satisfy the request to decrease communication resources;

resolving all communication resource elements in a free resource pool of the one server partition to a quarantine area of the one server partition;

de-allocating each memory block in which all communication resource elements associated with the memory block are resolved in the quarantine area;

determining whether the number of memory blocks that needs to be de-allocated has been de-allocated; and responsive to the number of memory blocks that needs to be de-allocated having been de-allocated, returning all communication resource elements that are not associated with a memory block marked for dynamic de-allocation from the quarantine area of the one server partition to the free resource pool of the one server partition, wherein responsive to the number of memory blocks that needs to be de-allocated not having been de-allocated. dynamically configuring the number of communication resource elements initialized in the one server partition further comprises:

computing a number of additional memory blocks that still needs to be de allocated to satisfy the request to decrease communication resources;

determining whether any memory blocks have been marked for dynamic de allocation; and responsive to no memory block having been marked for dynamic de-allocation, marking one or more memory blocks for dynamic de-allocation, a number of memory blocks marked for dynamic de-allocation being equal to the number of additional memory blocks still needed, each memory block marked for dynamic de-allocation being selected based on a number of communication resource elements associated with the memory block that is resolved in the quarantine area of the one server partition, and returning all communication resource elements that are not associated with a memory block marked for dynamic de-allocation from the quarantine area of the one server partition to the free resource pool of the one server partition, wherein responsive to one or more memory blocks having been marked for dynamic de-allocation, dynamically configuring the number of communication resource elements initialized in the one server partition further comprises:

determining whether a number of memory blocks marked for dynamic de-allocation is greater than or equal to the number of additional memory blocks still needed;

responsive to the number of memory blocks marked for dynamic de-allocation being greater than or equal to the number of additional memory blocks still needed, returning all communication resource elements that are not associated with a memory block marked for dynamic de-allocation from the quarantine area of the one server partition to the free resource pool of the one server partition.

3. The method of claim 2, wherein responsive to the number of memory blocks marked for dynamic de-allocation being less than the number of additional memory blocks still needed, dynamically configuring the number of communication resource elements initialized in the one server partition further comprises:

computing a number of memory blocks that further needs to be de-allocated to satisfy the request to decrease communication resources;

marking one or more memory blocks for dynamic de-allocation, a number of memory blocks marked for dynamic de-allocation being equal to the number of memory blocks further needed, each memory block marked for dynamic de-allocation being selected based on a number of communication resource elements associated with the memory block that is resolved in the quarantine area of the one server partition; and returning all communication resource elements that are not associated with a memory block marked for dynamic de-allocation from the quarantine area of the one server partition to the free resource pool of the one server partition.

* * * * *